United States Patent Office 3,781,418
Patented Dec. 25, 1973

3,781,418
PROCESS FOR COLORING THE SKIN WITH γ-DIALDEHYDES
Jean Pomot, Neuilly-sur-Seine, and Georges Rosenbaum, Asnieres, France, assignors to Societe Anonyme dite: L'Oreal, Paris, France
No Drawing. Filed Oct. 21, 1970, Ser. No. 82,836
Claims priority, application Luxembourg, Oct. 22, 1969, 59,682; Mar. 6, 1970, 60,481; Sept. 30, 1970, 61,789
Int. Cl. A61k 7/02
U.S. Cl. 424—63
2 Claims

ABSTRACT OF THE DISCLOSURE

A process for coloring the skin comprising applying to the skin in amounts sufficient to develop a coloring of the skin which resembles the tan coloring obtained by prolonged exposure to sunlight, a composition comprising a solution of gamma-dialdehyde.

---

This invention relates to a cosmetic composition for imparting to the skin a coloring which resembles the tan coloring obtained by prolonged exposure to sunlight.

Heretofore, various means have been used to give the skin a brown coloring similar to that achieved by a more or less prolonged exposure to the sun, such as ultraviolet lamps and cosmetic compositions containing α-hydroxyketones or α-hydroxyaldehydes, such as glyceric aldehyde, dihydroxyacetone and eruthrulose.

However, the results obtained with these compounds are far from satisfactory, because the development of the color on the skin is slow, requiring several hours, and the shades obtained tend toward yellow and consequently are not esthetic.

The present invention makes it possible to eliminate these drawbacks.

The present invention has for its object a cosmetic composition which when applied to the skin imparts thereto a coloring similar to that obtained by exposure to the sun's rays, this composition comprising a solution of at least one γ-dialdehyde having the formula:

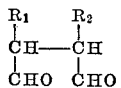

(I)

wherein $R_1$ and $R_2$, each independently, represents a member selected from the group consisting of hydrogen, halogen, hydroxy, methoxy or, together form a carbon-carbon bond or with oxygen form an epoxy bridge in a solvent selected from the group consisting of water and aqueous alcoholic solutions.

Representative γ-dialdehydes that can be used in the present invention, include maleic aldehyde, malic aldehyde, D,L-tartaric aldehyde, mesotartaric aldehyde, 2-hydroxy 3-chlorosuccinic aldehyde, 2,3-epoxysuccinic aldehyde, 2,3-dimethoxysuccinic aldehyde, 2-hydroxy 3-methoxysuccinic aldehyde and their mixtures.

The present invention is also directed to a process for coloring the skin which comprises applying to the skin in amounts effective to color the skin the composition as described above.

The compositions according to the invention are aqueous or dilute alcohol solutions of the compounds of Formula I, having a pH ranging between about 2–9, and containing from 0.1 to 12%, and preferably from 0.5 to 8% by weight of these compounds. Representative alcohols include the lower alkanols such as ethanol and isopropanol.

The γ-dialdehydes of Formula I are also preferably used in the form of acid hydrolysis product of a member selected from the group consisting of tetra- or di-hydrofurans and tetraalkylacetals.

Thus, it is possible to make a composition according to the invention from tetrahydrofurans or dihydrofurans having the formula:

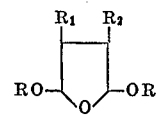

(II)

or tetraalkylacetals having the formula:

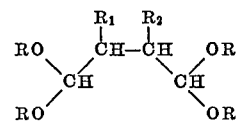

wherein $R_1$ and $R_2$ have the meaning given above and R is alkyl having 1 to 4 carbon atoms, by hydrolysis thereof with an acid such as, for example, hydrochloric acid or tartaric acid.

While compositions of the present invention do not possess, in themselves, dyeing properties, they do develop a coloring of the skin on contact therewith within a period ranging from about 5 to about 90 minutes, the length of time depending on such factors as the nature of the dialdehyde or dialdehydes used as well as the concentration thereof in said composition.

This fact constitutes an appreciable advantage over prior art compositions which effectively color the skin generally only after several hours contact thereof with the skin.

Another equally appreciable advantage of the compositions of the present invention over prior art compositions lies in the fact that the compositions of this invention make it possible to obtain a range of shades completely similar to those that result from prolonged exposure to the sun, i.e. the coloring achieved resembles a natural tan or brown coloration as compared to the unesthetic yellow overtones achieved with prior art compositions.

The compositions according to the invention can also contain other cosmetic ingredients such as perfumes or thickening agents or dispersants and be provided in the form of solutions, creams, gels or fluid emulsions ("milk"). They can also be packaged in aerosol containers.

Additionally, the compositions according to the present invention can also contain other known carbonyl products to give a coloring reaction with the skin, for example, dihydroxyacetone, diacetylbenzene, alloxane or ninhydrin.

The following examples are given to illustrate the present invention.

EXAMPLE 1

The following solution is prepared:

20% aqueous acid solution of tartaric aldehyde obtained by heating in a double boiler for 15 minutes 6.58 of 2,5-dimethoxy 3,4-dihydroxy tetrahydrofuran in 25 ml. of 0.01 N hydrochloric acid _____ cc__ 10
96° ethyl alcohol _____ cc__ 40
Perfume _____ g__ 0.1
Water sufficient for 100 cc.
Na$_2$CO$_3$, 2 N, sufficient for pH 6.

This solution is applied to the surface of the skin which it is desired to color. At the end of about 5 minutes, a brown coloring appears which resembles natural tanning. This coloring continues to intensify slightly for an hour and it remarkably resists fading even when exposed to fresh water, sea water or soaping.

EXAMPLE 2

A cream having the following composition is prepared by mixing together.

|  | G. |
|---|---|
| 20% aqueous solution of the tartaric aldehyde used in Example 1 | 10 |
| Dihydroxyacetone | 6 |
| Oxyethylene cetylstearyl alcohol, sold under the name of "Cire de Sipol" | 5 |
| Light Vaseline oil | 6 |
| Isopropyl myristate | 3 |
| White glycerin | 10 |
| Perfume | 0.3 |

Water sufficient for 100 g.

The pH of this composition is adjusted to 3 with a dilute tartaric acid solution.

This cream, which is white, is applied to the face in the same way as a beauty cream. At the end of a quarter hour, the skin shows a browning comparable to that which is attained by exposure to the sun. The coloring obtained is more natural, less yellow, than that which results from the application of dihydroxyacetone. The coloring continues to intensify for about an hour and it resists washing well. Further, the coloring is not eliminated by the use of conventional make-up removers.

EXAMPLE 3

The following dilute alcohol solution is prepared:

|  | Cc. |
|---|---|
| Maleic aldehyde (20% solution in 0.01 N HCl) | 25 |
| 96° ethyl alcohol | 40 |
| Perfume | 0.1 |

$Na_2CO_3$, 2 N, sufficient for pH 5.
Water sufficient for 100 cc.

This solution is applied uniformly over the entire surface of the skin it is desired to color. At the end of about 5 minutes, a copper coloring appears resembling natural tanning. The coloring remarkably resists baths in fresh and sea water as well as washing with soap.

EXAMPLE 4

The following non-alocholic gel is prepared:

| | |
|---|---|
| Maleic aldehyde (20% solution in 0.01 N HCl __cc__ | 13 |
| Tartaric aldehyde (20% solution in 0.01 n HCl __cc__ | 8 |
| Carboxyl derivative of the imidazole sold under the name "Miranol C 2M" (lauroylcycloimidinium-1-ethoxyethionic acid-ethionic acid, disodium salt) _____g__ | 1 |
| Carboxyvinyl polymer (carboxypolymethylene) sold under the name "Carbopol 934" _____g__ | 1 |

$Na_2CO_3$ sufficient for pH 7.
Water sufficient for 100 cc.

This gel is applied uniformly to the skin. At the end of 5 minutes an amber brown coloring appears which is comparable to that attained by exposure to the sun. This coloring resists baths in fresh and sea water very well and is only slightly affected by energetic soaping.

EXAMPLE 5

The following beauty milk is prepared:

| | |
|---|---|
| Oxyethylen ecetylstearyl alcohol, sold under the name "Cire de Sipol" _____g__ | 2.5 |
| Wheat starch _____g__ | 2 |
| Mixture of alkyl p-hydroxybenzoates and benzoyl, sold under the name "Nipaester 82521" _____g__ | 0.1 |
| Silicon oil, sold under the name "Rhodorsil Huile 47 V 300" _____g__ | 0.2 |
| Dihydroxyacetone _____g__ | 5 |
| 20% solution of maleic aldehyde in 0.01 N HCl _____cc__ | 15 |
| Perfume _____g__ | 0.1 |

Water sufficient for 100 cc.
Triethanolamine sufficient for pH 4.

This milk is applied uniformly to the skin. At the end of 5 minutes a golden brown coloring appears which persists even after baths in fresh and sea water. Further, the coloring resists fading even after soaping.

EXAMPLE 6

The following beauty milk is prepared:

|  | G. |
|---|---|
| Oxyethylene cetylstearyl alcohol, sold under the name "Cire de Sipol" | 2.5 |
| Wheat starch | 2 |
| Mixture of alkyl parahydroxybenzoates and benzoyl, sold under the name "Nipaester 82521" | 0.1 |
| Silicon oil, sold under the name "Rhodorsil Huile 47 V 300" | 0.2 |
| Dihydroxyacetone | 3 |
| 20% solution of maleic aldehyde in 0.01 N hydrochloric acid | 2.5 |
| 20% solution of tartaric aldehyde in 0.01 N hydrochloric acid | 1.5 |
| Perfume | 0.1 |

Triethanolamine sufficient for pH 4.
Water sufficient for 100 g.

This milk is applied uniformly to the skin. At the end of 10 minutes a golden coloring appears, which is slightly intensified during the following hour. The coloring thus attained resists baths in fresh and sea water and soaping.

EXAMPLE 7

The following beauty milk is prepared:

|  | G. |
|---|---|
| Oxyethylene cetylstearyl alcohol, sold under the name "Cire de Sipol" | 2.5 |
| Wheat starch | 2 |
| Mixture of alkyl parahydroxybenzoates and benzoyl, sold under the name "Nipaestear 82521" | 0.1 |
| Silicon oil, sold under the name "Rhodorsil Huile 47 V 300" | 0.2 |
| Dihydroxyacetone | 3 |
| 20% solution of maleic aldehyde in 0.01 N hydrochloric acid | 2.5 |
| 20% solution of tartaric aldehyde in 0.01 N hydrochloric acid | 1.5 |
| Perfume | 0.1 |

Triethanolamine sufficient for pH 3.
Water sufficient for 100 g.

This milk is applied uniformly to the skin. At the end of 10 minutes a golden coloring appears which intensifies slightly during the following hour. The coloring thus attained resists baths in fresh and sea water and soaping.

EXAMPLE 8

A cream having the following composition is prepared by mixing together:

|  | G. |
|---|---|
| Oxyethylene cetylstearyl alcohol, sold under the name "Cire de Sipol" | 5 |
| Light Vaseline oil | 6 |
| Isopropyl myristate | 3 |
| White glycerine | 10 |
| Perfume | 0.3 |
| 20% solution of D,L-tartaric aldehyde in 0.01 N hydrochloric acid | 15 |

$Na_2CO_3$ sufficient for pH 4.
Water sufficient for 100 g.

Applied to the face as a beauty cream, this cream, which is white, permits the skin to appear tanned at the end of a quarter of an hour. This coloring is more natural, less yellow, than that obtained with dihydroxyacetone. The coloring ceases to develop at the end of an hour. After washing with soap or with a make-up remover, a rather intense coloring of the same shade persists.

EXAMPLE 9

The following oleoalcohol solution is prepared:

| | G. |
|---|---|
| Colza oil (rapeseed oil) | 2 |
| Isopropyl myristate | 25 |
| Absolute ethyl alcohol | 60 |
| Perfume | 0.5 |
| Dihydroxyacetone | 3 |
| 20% aqueous solution of D,L-tartaric aldehyde | 9.5 |

This solution is introduced into aerosol bombs and, after crimping, 70 grams of Freon 12, dichlorodifluoromethane, are added. This composition is sprayed on all parts of the body which it is desired to color. After 10 minutes a clear golden brown coloring appears which continues to intensify slightly for an hour. This coloring appears more rapidly and is more natural than that obtained with dihydroxyacetone alone. It is very resistant to baths of sea water.

EXAMPLE 10

The following dilute alcohol solution is prepared:

| | |
|---|---|
| 15% aqueous solution of malic aldehyde | cc 10 |
| Ethyl alcohol, 96° titer | cc 40 |
| Perfume | g 0.1 |
| Na$_2$CO$_3$ sufficient for pH 7. | |
| Water sufficient for 100 cc. | |

This solution is applied uniformly to the entire surface of the skin it is desired to color. A brown coloring appears almost instantly, which is very fast to washing.

EXAMPLE 11

The milk of the following composition is prepared:

| | G. |
|---|---|
| Oxyethylene cetylstearyl alcohol, sold under the name of "Cire de Sipol" | 2.5 |
| Wheat starch | 2 |
| Mixture of alkyl parahydroxybenzoate and benzoyl, sold under the name "Nipaester 82521" | 0.1 |
| Silicon oil, sold under the name "Rhodorsil Huile 47 V 300" | 0.2 |
| 10% aqueous solution of 2-hydroxy 3-chlorosuccinic aldehyde | 20 |
| Perfume | 1 |
| NaHCO$_3$ sufficient for pH 3.5. | |
| Water sufficient for 100 g. | |

Applied uniformly to the skin, this milk, which is perfectly white, makes it possible to obtain in 20 minutes a golden shade, which intensifies during the following hour. The coloring thus achieved persists, even after baths in fresh and sea water. This coloring also resists washings with soap and make-up removers.

EXAMPLE 12

The following non-alcoholic gel is prepared:

| | G. |
|---|---|
| Imidazole carboxyl derivative sold under the name "Miranol C 2M" (lauroyl - cycloimidinium - 1-ethoxyethionic acid-ethionic acid, disodium salt) | 1 |
| Carboxyvinyl polymer (carboxypolymethylene) sold under the name "Carbopol 934" | 1 |
| 5% aqueous solution of 2,3-epoxysuccinic aldehyde | 37 |
| Na$_2$CO$_3$, sufficient for pH 8. | |
| Water sufficient for 100 g. | |

This gel is applied uniformly to the skin. At the end of 15 minutes a golden brown coloring appears which is very resistant to all washings.

EXAMPLE 13

The following composition is prepared:

| | G. |
|---|---|
| Vaseline oil | 18 |
| Glycerine | 4.5 |
| Oxyethylene alcohol, sold under the name "Polawax G.P. 200" | 2.4 |
| 5% aqueous solution of 2,3-epoxysuccinic aldehyde | 20 |
| 20% aqueous solution of D,L-tartaric aldehyde | 12 |
| Na$_2$CO$_3$ in 2 N solution sufficient for pH 5. | |
| Water sufficient for 60 g. | |

This composition is introduced into an aerosol bomb and, after crimping, 10 g. of Freon 12 (dichlorodifluoromethane) are added. The form obtained is applied to the parts of the body it is desired to color. After 10 minutes a natural golden brown coloring appears, which satisfactorily desists baths in sea water and washing with soap.

EXAMPLE 14

The following composition is prepared:

| | G. |
|---|---|
| Oxyethylene cetylstearyl alcohol, sold under the name "Cire de Spiol" | 5 |
| Light Vaseline oil | 6 |
| Isopropyl myristate | 3 |
| (White glycerine) | 10 |
| Perfume | 0.3 |
| 20% aqueous solution of D,L-tartaric aldehyde | 5 |
| 15% aqueous solution of malic aldehyde | 7 |
| 10% aqueous solution of 2-hydroxy 3-chlorosuccinic aldehyde | 3 |
| 5% aqueous solution of mesotartaric aldehyde | 6 |
| 3% aqueous solution of mesotartaric aldehyde | 6 |
| NaHCO$_3$ sufficient for pH 3. | |
| Water sufficient for 100 g. | |

This perfectly white cream is applied to the skin. At the end of about a quarter of an hour, a copper brown coloring appears, resembling natural tanning. This coloring is very stable in sea water baths and to soap and regular make-up removers.

EXAMPLE 15

The following dilute alcohol composition is prepared:

| | |
|---|---|
| 10% aqueous solution of 2-hydroxy 3-methoxysuccinic aldehyde | cc 25 |
| Ethyl alcohol, 96° titer | cc 40 |
| White glycerine | cc 2 |
| Perfume | g 0.2 |
| Na$_2$CO$_3$ sufficient for pH 8. | |
| Water sufficient for 100 g. | |

This solution is applied either to the body or face, for example, as an after shave lotion. It is particularly suitable for skins with a red complexion, to which it gives a tan coloring, which coloring appears in less than 10 minutes. This coloring persists even after washing with soap.

EXAMPLE 16

The following cream is prepared:

| | G. |
|---|---|
| Oxyethylene cetylstearyl alcohol, sold under the name "Cire de Sipol" | 4.5 |
| Light Vaseline oil | 6 |
| Isopropyl myristate | 3.5 |
| White glycerine | 10 |
| Perfume | 0.5 |
| 10% aqueous solution of 2-hydroxy 3-methoxysuccinic aldehyde | 10 |
| 20% aqueous solution of mesotartaric aldehyde | 6 |
| NaHCO$_3$ sufficient for pH 4. | |
| Water sufficient for 100 g. | |

When applied to the skin, this white cream imparts to it, at the end of a quarter of an hour, an intense natural tan coloring. This coloring persists after baths in the sea and the coloring remains intense after washing with soap.

EXAMPLE 17

The following composition is prepared:

| | G. |
|---|---|
| Oxyethylene cetylstearyl alcohol, sold under the name "Cire de Sipol" | 2.5 |
| Wheat starch | 2 |
| Mixture of alkyl parahydroxybenzoates and benzoyl, sold under the name "Nipaester 82521" | 0.1 |
| Silicon oil, sold under the name of "Rhodorsil Huile 47 V 300" | 0.2 |
| 10% aqueous solution of 2,3-dimethoxysuccinic aldehyde | 10 |
| 20% aqueous solution of D,L-tartaric aldehyde | 8 |
| Perfume | 0.2 |

NaHCO$_3$, sufficient for pH 3.
Water sufficient for 100 g.

A white milk is obtained, which, when applied uniformly to the skin, imparts thereto in 10 minutes a golden coloring which then deepens to an increase tan during the following hour. This coloring resists sea water, soap and make-up removers.

The following is a brief description of certain of the components utilized in formulating the composition of this invention:

Cire de Sipol, contains 80% fatty alcohols and 20% oxyethylenated fatty alcohol; the fatty alcohols are a mixture of 30% cetyl alcohol and 70% stearyl alcohol; the oxyethylenated fatty alcohols contain about 85% ethylene oxide and 15% of a mixture of fatty alcohols; the HLB (hydrophiliclipophilic balance) is 17.

Light Vaseline oil, liquid obtained by the successive action of sulfuric acid and soda on fractions of Caucasus oil boiling from 335 to 440° C.

Rhodorsil Huile 47 V 300, methyl polysiloxane.

Polawax G.P. 200, a preparation of stearyl alcohol and ethylene oxide reaction products.

What is claimed is:

1. A process for coloring the skin comprising applying to the skin in amounts sufficient to develop a coloring of the skin which resembles the tan coloring obtained by prolonged exposure to sunlight, a composition comprising a solution of a γ-dialdehyde selected from the group consisting of D,L-tartaric aldehyde, mesotartaric aldehyde, malic aldehyde, 2 - hydroxy - 3 - chlorosuccinic aldehyde, 2,3-epoxysuccinic aldehyde, 2,3-dimethoxysuccinic aldehyde, 2-hydroxy-3-methoxysuccinic aldehyde and their mixtures, in a solvent selected from the group consisting of water and an aqueous solution of an alcohol selected from the group consisting of ethanol and isopropanol, said γ-dialdehyde being present in amounts of about 0.1 to 12% by weight of said composition and said color being developed within a period ranging from about 5 to about 90 minutes.

2. The process of claim 1 wherein said composition has a pH ranging between 2–9.

References Cited

UNITED STATES PATENTS

| | | | |
|---|---|---|---|
| 2,465,586 | 3/1949 | Gaspar | 260—601 |
| 2,515,304 | 7/1950 | Jones | 260—347.8 X |
| 2,649,355 | 8/1953 | White et al. | 260—64 X |

OTHER REFERENCES

Seligsberger et al.: Journal of American Leather Chemists, November 1957, vol. 52, pp. 2–23 (pp. 5, 8, to 11, 13, 18, 20, 17 relied on).

ALBERT T. MEYERS, Primary Examiner

D. R. ORE, Assistant Examiner

U.S. Cl. X.R.

424—47, 59, 168, 172